(12) United States Patent
Sauer et al.

(10) Patent No.: US 10,080,474 B2
(45) Date of Patent: Sep. 25, 2018

(54) VACUUM CLEANER FILTER BAG

(71) Applicant: Eurofilters Holding N.V., Overpelt (BE)

(72) Inventors: Ralf Sauer, Overpelt (BE); Jan Schultink, Overpelt (BE)

(73) Assignee: Eurofilters Holding N.V., Overpelt (BE)

( * ) Notice: Subject to any disclaimer, the term of this patent is extended or adjusted under 35 U.S.C. 154(b) by 431 days.

(21) Appl. No.: 14/775,301

(22) PCT Filed: Mar. 12, 2014

(86) PCT No.: PCT/EP2014/054885
§ 371 (c)(1),
(2) Date: Sep. 11, 2015

(87) PCT Pub. No.: WO2014/140127
PCT Pub. Date: Sep. 18, 2014

(65) Prior Publication Data
US 2016/0022105 A1   Jan. 28, 2016

(30) Foreign Application Priority Data

Mar. 15, 2013   (EP) ..................... 13159331

(51) Int. Cl.
*A47L 9/14* (2006.01)
*B01D 39/16* (2006.01)

(52) U.S. Cl.
CPC .............. *A47L 9/14* (2013.01); *B01D 39/16* (2013.01); *B01D 39/1623* (2013.01);
(Continued)

(58) Field of Classification Search
None
See application file for complete search history.

(56) References Cited

U.S. PATENT DOCUMENTS 4,917,942 A * 4/1990 Winters ............... A47L 9/14
96/99
5,090,975 A * 2/1992 Requejo ............... A47L 9/14
134/21
(Continued)

FOREIGN PATENT DOCUMENTS

DE   101 20 223 A1   10/2002
DE   600 03 431 T2    4/2004
(Continued)

OTHER PUBLICATIONS

International Search Report dated Apr. 10, 2014 for International Application No. PCT/EP2014/054885.
(Continued)

*Primary Examiner* — Amber R Orlando
*Assistant Examiner* — Brit E Anbacht
(74) *Attorney, Agent, or Firm* — Brinks Gilson & Lione

(57) ABSTRACT

The invention provides a vacuum cleaner filter bag comprising a first filter layer and a second filter layer, wherein the first filter layer is arranged upstream of the second filter layer in air flow direction, and wherein the first filter layer has at least 3 and at most 25 individual plies, especially at least 5 and at most 15 individual plies, wherein each individual ply is a dry-laid nonwoven having a basis weight of 5 g/m² to 50 g/m², especially having a basis weight of 8 g/m² to 30 g/m².

20 Claims, 4 Drawing Sheets

(52) U.S. Cl.
CPC .............. *B01D 2239/065* (2013.01); *B01D 2239/1208* (2013.01); *B01D 2239/1233* (2013.01); *B01D 2239/1258* (2013.01); *B01D 2239/1291* (2013.01)

(56) References Cited

U.S. PATENT DOCUMENTS

| | | | |
|---|---|---|---|
| 5,647,881 A | 7/1997 | Zhang et al. | |
| 6,416,562 B1* | 7/2002 | Shibuya | B01D 39/1623 55/486 |
| 6,554,881 B1* | 4/2003 | Healey | B01D 39/1623 156/62.4 |
| 8,070,858 B2 | 12/2011 | Schultink et al. | |
| 8,479,356 B2 | 7/2013 | Sauer et al. | |
| 8,784,525 B2 | 7/2014 | Schultink et al. | |
| 8,852,306 B2 | 10/2014 | Schultink et al. | |
| 2003/0037675 A1* | 2/2003 | Gillingham | B01D 39/1623 95/280 |
| 2008/0115671 A1* | 5/2008 | Sauer | A01N 25/34 96/223 |
| 2010/0218470 A1* | 9/2010 | Schultink | A47L 9/14 55/382 |
| 2013/0199141 A1* | 8/2013 | Hamada | B01D 39/163 55/486 |
| 2015/0211157 A1* | 7/2015 | Okuda | D04H 3/04 442/334 |

FOREIGN PATENT DOCUMENTS

| | | |
|---|---|---|
| DE | 20 2005 000 917 U1 | 4/2005 |
| DE | 103 48 375 A1 | 5/2005 |
| DE | 20 2005 016 309 U1 | 1/2006 |
| DE | 10 2005 060 032 A1 | 6/2007 |
| DE | 600 32 223 T2 | 9/2007 |
| DE | 20 2007 018 375 U1 | 8/2008 |
| DE | 10 2007 027 299 A1 | 12/2008 |
| EP | 1 258 277 A1 | 11/2002 |
| EP | 1 661 500 A1 | 5/2006 |
| EP | 2 067 427 A2 | 6/2009 |
| EP | 2 201 874 A1 | 6/2010 |
| EP | 2 263 507 A1 | 12/2010 |
| EP | 2 359 730 A1 | 8/2011 |
| WO | WO 2005/034708 A1 | 4/2005 |
| WO | WO 2011/113544 A2 | 9/2011 |

OTHER PUBLICATIONS

Hellmann, A. et al.; "Determining the separation efficiency of fibrous filter media for ultrafine particles"; Nanopartikel, vol. 72; pp. 484-488; Nov./Dec. 2012; Abstract translated.

* cited by examiner

| Spunbond plies at 17 g/m² each | Air flow [l/s] for 0g DMT8 | Air flow [l/s] for 200g DMT8 | Air flow [l/s] for 400g DMT8 |
|---|---|---|---|
| 5 plies | 38,0 | 34,9 | 32,9 |
| 8 plies | 37,9 | 34,9 | 32,9 |
| 11 plies | 37,7 | 34,6 | 32,2 |
| 15 plies | 37,7 | 33,9 | 30,8 |

Fig. 5

| Carded plies at 15 g/m² each | Air flow [l/s] for 0g DMT8 | Air flow [l/s] for 200g DMT8 | Air flow [l/s] for 400g DMT8 |
|---|---|---|---|
| 5 plies | 37,5 | 35,3 | 33,2 |
| 8 plies | 37,4 | 35,8 | 34,0 |
| 11 plies | 37,2 | 35,8 | 34,0 |
| 15 plies | 37,3 | 36,1 | 34,5 |

Fig. 6

VACUUM CLEANER FILTER BAG

This application claims the benefit under 35 U.S.C. § 371 of International Application No. PCT/EP2014/054885, filed Mar. 12, 2014, which claims the benefit of European Patent Application No. 13159331.1, filed Mar. 15, 2013, which are incorporated by reference herein in their entirety.

The invention relates to a vacuum cleaner filter bag with a first filter layer and a second filter layer for use in household vacuum cleaner devices.

Such vacuum cleaner filter bags are known from prior art. EP 1 258 277 A1 discloses a multilayer nonwoven bag with a coarse and a fine filter ply. The fine filter ply, for example, being formed by a meltblown ply, is to have high separation performance for fine dust, so that the lowest penetration possible of the vacuum cleaner filter bag by the smallest particles occurs. The coarse filter ply is in contrast to have a high dust-holding capacity for larger particles to avoid clogging of the fine filter ply due to these particles.

DE 101 20 223 B4 describes a multilayered air filter comprising a filter layer made of a combination of spunbond with meltblown nonwoven fabric or of a spunbond-meltblown-spunbond laminate and a prefilter layer covering it on the raw gas side, where the prefilter layer comprises dry-laid and electrostatically active staple fiber nonwoven fabric, the basis weight of which amounts to 10 to 100 g/m$^2$. The dry-laid electrostatically active staple fiber nonwoven fabric there has a permeability to air greater than or equal to 700 l/m$^2$/s, preferably greater than or equal to 1000 l/m$^2$/s, at a differential pressure of 200 Pa, NaCl-transmittance of less than or equal to 40%, preferably less than or equal to 30%, and a differential pressure of less than 20 Pa. The prefilter layer is manufactured from staple fibers having a titer of <10 dtex. The prefilter layer can also be manufactured from staple fibers having a titer of 0.5 to 5 dtex at a basis weight of 30 to 60 g/m$^2$.

In order to improve the function of the filter layers, the composition of the dust collected, the air flow rate, the size and shape of the available installation space in the vacuum cleaner are to be considered. The available space due to its size, its shape and its volume limits the material quality to be employed in terms of material thickness, grammage and stiffness. The volume flow predetermined by the vacuum cleaner and thereby the media passage speed affect the dust collection capacity of the coarse filter layer. Coordinating these parameters is complex. Simple rules can hardly be defined. It has for instance shown that increasing the thickness or grammage of the coarse filter layer does not necessarily lead to improved service life of the vacuum cleaner filter bag. A change in the thickness, density or geometry or mixture of fibers used in the coarse filter layer additionally often leads to unexpected and undesirable effects.

Given the above-mentioned, the invention is based on the object of providing a vacuum cleaner filter bag with improved filtration properties. This object is satisfied by a vacuum cleaner filter bag having the features of claim 1.

The vacuum cleaner filter bag according to the invention comprises a first filter layer and a second filter layer, where the first filter layer is in air flow direction arranged upstream of the second filter layer, and where the first filter layer comprises at least 3 and at most 25 individual plies, in particular at least 5 and at most 15 individual plies, where each individual ply is a dry-laid nonwoven fabric having a basis weight of 5 g/m$^2$ to 50 g/m$^2$, in particular having a basis weight of 8 g/m$^2$ to 30 g/m$^2$.

It has surprisingly shown that such a configuration of the first filter layer in terms of the dust-holding capacity for a given grammage (basis weight) and composition is a simple and effective way to improve the performance of the filter bag. The first filter layer is for this built up of a plurality of (light) individual plies (individual layers). Compared to an individual ply having the same structure (type, length, diameter of the fibers), and having the same overall basis weight, the dust-holding capacity of the first filter layer surprisingly improves considerably. The first filter layer can thereby fulfill the function of a coarse filter layer, while the second filter layer can serve as a fine filter layer.

The term "nonwoven fabric" is used within the meaning of standard EN ISO 9092:2011. According thereto, nonwoven fabrics are structures of textile material, such as fiber structures, continuous filaments or short fiber yarns irrespective of their property or origin, which were formed by some method into a sheet structure and were bound by some method other than interweaving yarns as in woven fabric, knitted fabric, knitwear, lace or tufted fabric. Film and paper structures are not considered to be nonwoven fabrics. Nonwoven fabric is therefore obtained by first forming a web formation, followed by performing web bonding. Web formation is performed by a dry-laid web process, a wet-laid web process or a spunbond process, where the latter also includes special techniques such as melt-blowing. Bonding can be effected by chemical means, by heat action and/or by mechanically processing. It should be noted that this conceptual distinction between "web" or "nonwoven-web" and "nonwoven" or "nonwoven fabric" is in prior art not always made clear. The dry-laid nonwoven fabric can comprise, in particular exclusively comprise staple fibers.

The presently mentioned "nonwoven individual plies" of the first filter layer are therefore each bonded webs (and hence non-woven fabric), each of which form a self-supporting and stable ply (layer). What is not meant, however, are superposed webs (or cellulose wadding) which are then bonded together. For example, superposed carded webs are known from prior art which are then bonded by needling and thereby also bonded together. In this way, however, not several nonwoven individual plies but only one single (thicker) nonwoven fabric is obtained.

Also airlaid nonwovens known from prior art, where first several plies of loose staple fibers are deposited superposed in the manufacturing process and are then e.g. bonded together by thermal activation of melt fibers, are no nonwoven individual plies according to the invention.

The vacuum cleaner filter bags are provided in particular for household vacuum cleaners, i.e. for use in household vacuum cleaners.

The first filter layer (comprising the above-mentioned plurality of individual plies) can have a basis weight of at least 25 g/m$^2$ and/or at most 300 g/m$^2$, in particular a basis weight of at least 50 g/m$^2$ and/or at most 200 g/m$^2$. Such a total basis weight of the first filter layer has proven to be advantageous for the production of the vacuum cleaner filter bags.

The first filter layer can have a permeability to air of more than 1500 l/(m$^2$ s), in particular of more than 2000 l/(m$^2$ s). The permeability to air of the first filter layer can in particular at a basis weight of up to 150 g/m$^2$ amount to more than 2000 l/(m$^2$ s). The permeability to air of the first filter layer can at a basis weight of up to 50 g/m$^2$ amount to more than 1500 l/(m$^2$ s).

Every individual ply of the first filter layer can have a permeability to air of more than 6000 l/(m$^2$s), in particular of more than 7000 l/(m$^2$s). The permeability to air can also be greater or equal to 7500 l/(m$^2$s).

Such permeabilities to air lead to a high suction air flow of the vacuum cleaner.

In the vacuum cleaner filter bags described above, the first filter layer can have a penetration of more than 60%, in particular of more than 75%. Alternatively or additionally, the second filter layer can have a penetration of less than 40%, in particular of less than 25% or less than 10%. The second filter layer can in particular have a penetration of less than 1.5%.

The lower limits mentioned for the penetration of the first filter layer lead to a particularly suitable coarse filtering effect. In other words, this allows the use of the first filter layer in an advantageous manner as a coarse filter layer. The upper limits for the second filter layer lead to a preferred fine filter function, so that the second filter layer is used as a fine filter layer.

In the vacuum cleaner filter bags described above, each individual ply of the first filter layer can have a penetration of more than 90%, in particular of more than 95%. This allows the penetration of particles to plies in air flow direction arranged deeper or farther rearwardly, which results in an advantageous deposit of particles The dust-holding capacity of the first filter layer is thereby increased.

The thickness of the first filter layer of the vacuum cleaner filter bag as described above can be greater than or equal to 0.8 mm/(100 g/m$^2$), in particular greater than or equal to 1 mm/(100 g/m$^2$), and/or less than or equal to 2 mm/(100 g/m$^2$), in particular less than or equal to 1.5 mm/(100 g/m$^2$). Limitation to thicknesses greater than/equal to said lower limits for the thickness of the first filter layer leads to improved dust-holding capacity. Limitation to thicknesses less than/equal to the upper thickness limits enables easier unfolding of the bag in the installation space of the vacuum cleaner. In particular, the thickness of each individual ply of the first filter layer can be less than or equal to 0.5 mm.

In the vacuum cleaner filter bags described above, the first filter layer can have a pressure loss of less than 2 mm H$_2$O. This leads to improved suction performance during operation in a vacuum cleaner. In particular, each individual ply of the first filter layer can have a pressure loss of less than 1 mm H$_2$O.

Each individual ply of the first filter layer of the vacuum cleaner filter bag described above can comprise staple fibers having a titer of at least 1 dtex and/or at most 20 dtex, in particular of at least 2 dtex, in particular of at least 5 dtex, and/or at most 15 dtex. It has been found that such fiber titer when loading the vacuum cleaner filter bag with dust leads to less of a drop in volume flow, whereby the tendency of the bag to clog is reduced. The staple fibers can in particular have a titer of at most 12 dtex.

Each individual ply of the first filter layer of the vacuum cleaner filter bag described above can be a carded ply or an airlaid ply. One of the individual plies can in particular in the first filter layer be a carded ply and another of the individual plies an airlaid layer. The first filter layer can by such "mixing" of carded and airlaid plies in an advantageous manner be adjusted for a desired coarse filter function. The various individual plies can each comprise staple fibers having various titers. In particular the filter layer being first in the sequence of individual plies can have a titer gradient. Preferably, the individual ply being arranged farthest upstream comprises staple fibers with the greatest titer and the individual ply arranged farthest downstream has staple fibers with the lowest titer.

The individual plies of the first filter layer can be formed being equal or different. They can be equal or differ in particular in terms of the following parameters: permeability to air, basis weight, fiber material, fiber titer, penetration, thickness, fiber mix.

The fibers of the first filter layer of the vacuum cleaner filter bags described above can comprise synthetic fibers, in particular made of polypropylene or polyester. The proportion of synthetic fibers among the fibers of the first filter layer can be at least 90%, in particular at least 95%. The fibers of the first filter layer can entirely be synthetic fibers. The synthetic fibers can be monocomponent and/or bi-component fibers. In addition to synthetic fibers, the fibers of the first filter layer can also comprise plant fibers, such as cellulose fibers In the vacuum cleaner filter bags described above, the individual plies of the first filter layer can be bonded to each other along the edge. The individual plies are in particular preferably not to be bonded to each other over the entire surface. The bond can be effected by welding or adhesive bonding. The individual plies of the first filter layer can in particular be bonded to each other exclusively along the edge. Along the edge means that a bonding line or a bonding region (for example in the form of a strip) runs parallel to the edge of the individual plies or parallel to the bag edge. The bonding line or the bonding region can be an adhesive or welding line or an adhesive or welding region; they are sometimes referred to as adhesive or weld seam. The bonding line or the bonding region can, for example, run at a distance of one or several millimeters from the edge. The distance to the edge is preferably less than 10 mm, in particular less than 5 mm.

However, additional bonding points or locations (in addition to the bond along the edge) are also possible. Preferably, at least 90%, in particular at least 95%, of the area of each individual ply within the bond (e.g. of the bonding line or of the bonding region) along the edge are not bonded to the adjacent individual ply or plies.

Particles can in this manner also deposit between the individual plies, which results in an increase in the dust-holding capacity.

The second filter layer can comprise one or more meltblown plies, in particular be made thereof. In combination with the first filter layers described above, an advantageous fine filter layer can be produced in this manner. The meltblown ply can contain nanofibers. Alternatively or additionally, the second filter layer can comprise one or more nanofiber plies. One such nanofiber ply can, for example, be bonded to a meltblown ply. The nanofibers can have an average diameter of at most 500 nm. The nanofibers can be obtained by electrospinning.

The vacuum cleaner filter bag described above can further comprise a stabilizing ply and/or a protective ply. Such stabilizing and/or protective plies can be, for example, spunbond and/or a mesh, in particular an extruded mesh. Such stabilizing and/or protective plies can be arranged in air flow direction upstream of the first filter layer and/or downstream of the second filter layer.

The vacuum cleaner filter bags described above can in principle be formed in any bag shape tailorable from non-wovens. They can be configured in particular as flat bags or as block bottom bags. As a flat bag, the vacuum cleaner filter bag is then formed such that it has no block bottom. A bottom is referred to as a block bottom where it gives the bag a three-dimensional external shape. A "three-dimensional" external shape is understood to be an extension of the bag in three dimensions extending beyond the extension of the bag in a third dimension only due to the filter material thickness. The task of the bottom is commonly to stabilize the filter bag. With bags made of paper filter material, the block bottom is obtained by the filter material being suitable folded. With nonwoven bags, a respective outer shape can also be obtained, however, not necessarily by folding; such bags as well are presently to be understood as block bottom bags. Examples of a block bottom bag filter are known from DE 20 2005 016 309, EP 2 067 427, EP 1 677 660, DE 103 48 375 or DE 10 2005 060 032.

Flat bags are described, for example, in U.S. Pat. No. 5,647,881 or EP 1 661 500. In a flat bag, for example, two bag wall materials are superposed and bonded together at the edges. The bond can be effected in particular by welding or adhesive bonding. The bag wall materials are typically rectangular. A cavity is formed between the two bag wall materials, in particular during operation of the vacuum cleaner filter bag, and filled with dust. The inlet opening of the bag is located in one of the bag wall materials. Each bag wall material comprises two or more filter layers, where the two or more filter layers comprise the first and the second filter layer described above. The first and the second filter layer are present preferably in both bag wall materials. Alternatively, a flat bag can also be obtained by forming the vacuum cleaner filter bag as a tubular bag, as described, for example, in EP 2 359 730. The flat bag can have one or more side gussets; this is shown, for example, in DE 20 2005 000 917.

Further features and advantages are described below with reference to the figures, in which:

FIG. 5 shows a table for the drop in volume flow;

FIG. 6 shows a table for the drop in volume flow.

The following methods were used for measuring the different parameters: The basis weight was determined according to EN 29073-1:1992. The thickness of the materials was determined according to EN ISO 9073-2:1996 (always following Method A for normal nonwovens). The permeability to air was determined according to EN ISO 9237:1995 with an area of 20 cm$^2$ and a differential pressure of 200 Pa. Penetration was measured with the instrument CERTITEST TSI 8130 at 86 l/min. NaCl aerosol generated by the aerosol generator 8118A was used as the aerosol. The pressure loss in mm H$_2$O was also determined with the instrument TSI 8130 at 86 l/min.

Figure 1A:
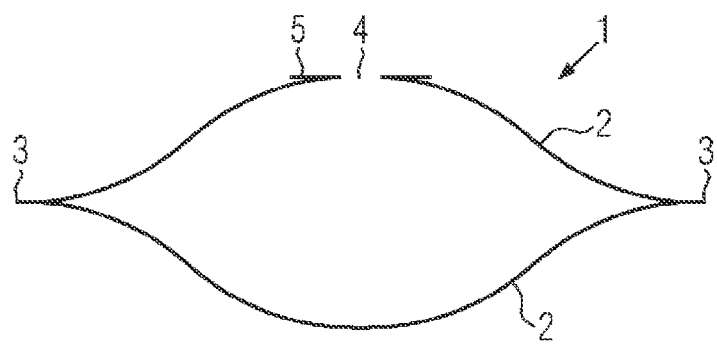
FIG. 1A shows a schematic cross-sectional view of a vacuum cleaner filter bag.
Figure 1B:
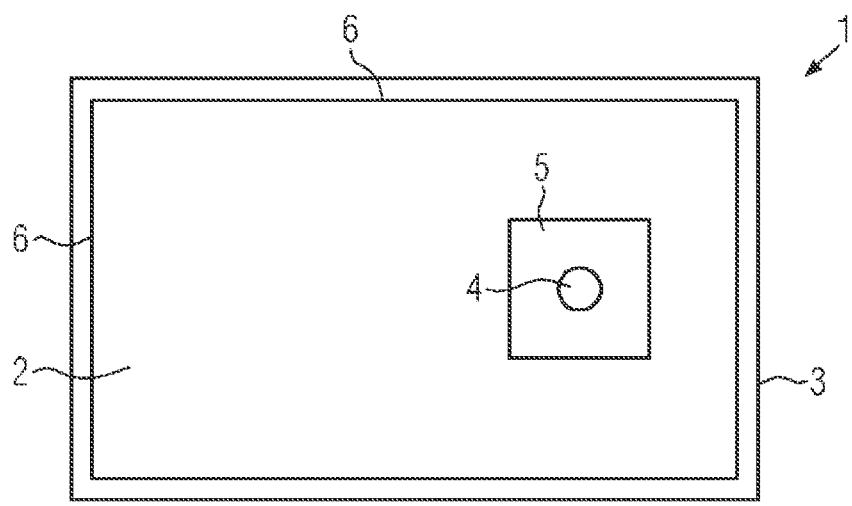
FIG. 1B shows a schematic plan view of a vacuum cleaner filter bag.

FIG. 1A schematically shows a cross section through a vacuum cleaner filter bag 1 in the form of an (expanded) flat bag for which a plan view is shown in FIG. 1B. The bag wall is composed of two superposed bag wall materials 2 having a rectangular shape which are bonded together along edge 3. An inlet opening 4 is provided in one of the two wall sections 2 and has a holding plate 5 attached to it. The holding plate 5 serves to hold the vacuum cleaner filter bag in the interior of a vacuum cleaner. Such a plate can be, for example, adhesively bonded or welded to the filter material of the bag wall. The bond of the two bag wall materials 2 is typically effected by welding or adhesive bonding. The encircling bond creates a hem or an adhesive or weld seam 6.

During operation of the vacuum cleaner filter bag, a dust-laden air flow is sucked through inlet opening 4 into the bag. The air then exits the filter bag through the bag wall so that the air flow direction leads from the interior of the bag towards the exterior.

Figure 2:
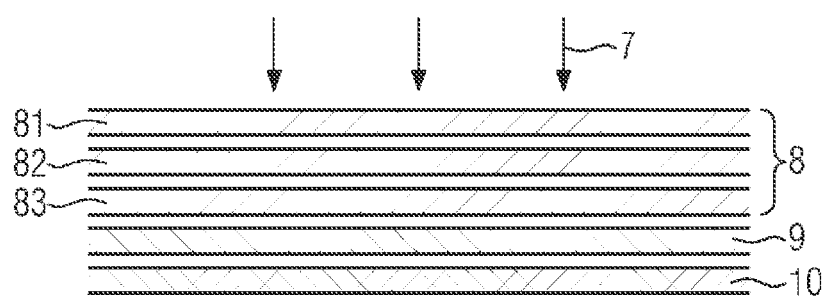
FIG. 2 shows a schematic cross-sectional view of the filter material structure of an example of a bag wall.

FIG. 2 schematically shows the structure of the filter material of a bag wall as it can be used, for example, in a flat bag according to FIG. 1. Arrows 7 indicate the air flow direction during operation of the vacuum cleaner filter bag.

A coarse filter layer 8 is in air flow direction provided first and corresponds to the first filter layer described above. It is followed by a fine filter layer 9 which corresponds to the second filter layer described above. A stabilizing ply 10 is further provided at the outside of the bag.

Coarse filter layer 8 is in the example shown composed of three individual plies 81, 82 and 83 which are provided in the form of nonwoven fabric plies. Each of these individual plies is thereby self-supporting. This is achieved by a respective web bonding or web stabilization process, for example, by calendering a web. The underlying web is a dry-laid web, for example, a carded web or an airlaid web. Such dry-laid webs are made from staple fibers which are in particular synthetic fibers, such as polypropylene or polyester.

Individual plies 81, 82 and 83 are not bonded to each other over the entire surface. A bond is present at bag edge 3 where the individual plies are welded or adhesively bonded. Within hem 6, i.e. within the area surrounded ("framed") by the hem, the individual plies are not or only at isolated or discrete locations bonded together (e.g. by adhesive or welding spots or strips). The unbonded area within the area defined by the hem is to amount to be at least 90%, preferably at least 95% of the surface. Dust can in this manner enter the individual plies and the spaces located therebetween and be stored there.

A fine filter layer 9 being configured in the form of a meltblown ply is in the air flow located downstream of coarse filter layer 8. Farthest downstream is (optional) stabilizing ply 10 in the form of a spunbond which increases the mechanical stability of the bag and serves to protect fine filter ply 9.

Similar to the case of the individual plies, also fine filter layer 9 or stabilizing ply 10, respectively, are bonded to the other plies along the edge, i.e. by the same weld or adhesive seam. Furthermore, fine filter layer 9 and stabilizing ply 10 are not or only at individual or discrete locations bonded to adjacent plies. Here as well, the unbonded area is preferably at least 90%, in particular at least 95% of the total surface within the hem or the bond seam.

The advantageous and surprising effect of the present invention arises from the figures discussed below.

Figure 3:
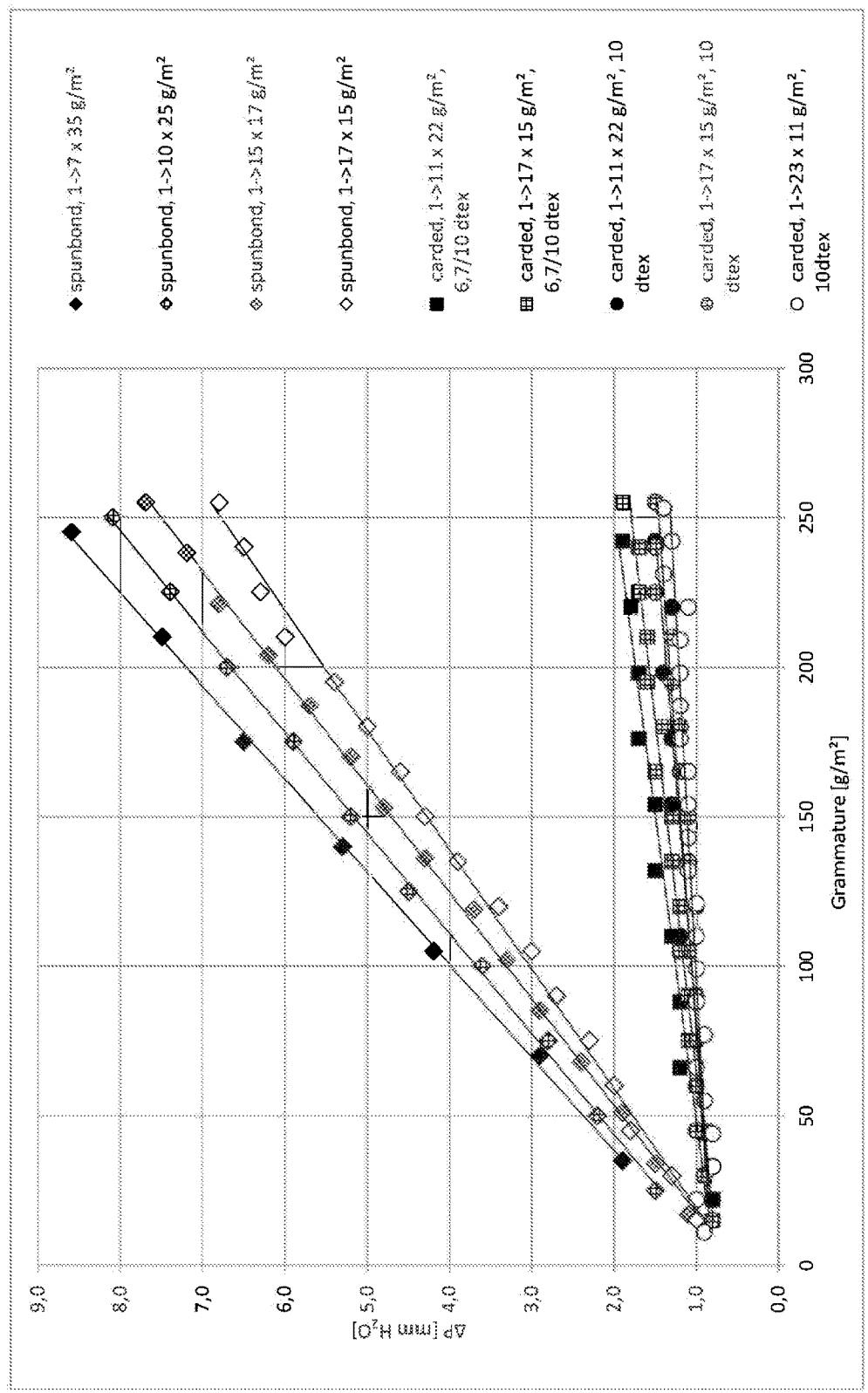
FIG. 3 shows a graph of the dependence of the pressure loss of a coarse filter layer for various materials.

FIG. 3 shows a graph in which the pressure loss AP is plotted for various possibly employed coarse filter layers in dependence of the basis weight (grammage) of the total layer, in other words in dependence of the number of individual plies. Multiply spunbond layers and multiply layers with individual plies of carded and calendered nonwoven were examined. In the case of spunbond nonwovens, filter layers with identical individual plies were examined each having a basis weight of 35 g/m$^2$ (1-7 plies), 25 g/m$^2$ (1 to 10 plies), 17 g/m$^2$ (1 to 15 plies) and 15 g/m$^2$ (1 to 17 plies). The filter layers with carded nonwoven fabrics were composed of identical individual plies having a basis weight of 22 g/m$^2$ (1 to 11 plies, fiber mixture with titers of 6.7 dtex and 10 dtex), 15 g/m$^2$ (1 to 17 plies, fiber mixture with titers of 6.7 dtex and 10 dtex), 22 g/m$^2$ (1 to 11 plies, titer 10 dtex), 15 g/m$^2$ (1 to 17 plies, titer 10 dtex) and 11 g/m$^2$ (1 to 23 plies, titer 10 dtex). All nonwovens were composed of polypropylene staple fibers or filaments.

As is clearly evident, the pressure loss with the multiply spunbond layers increases sharply with an increasing number of individual plies. In contrast, the pressure loss increases only very slightly with the multiply filter layers made of carded nonwovens, even for a high number of individual plies. Increasing the number of individual plies therefore has little effect on the pressure loss in the case of carded nonwovens.

Figure 4:
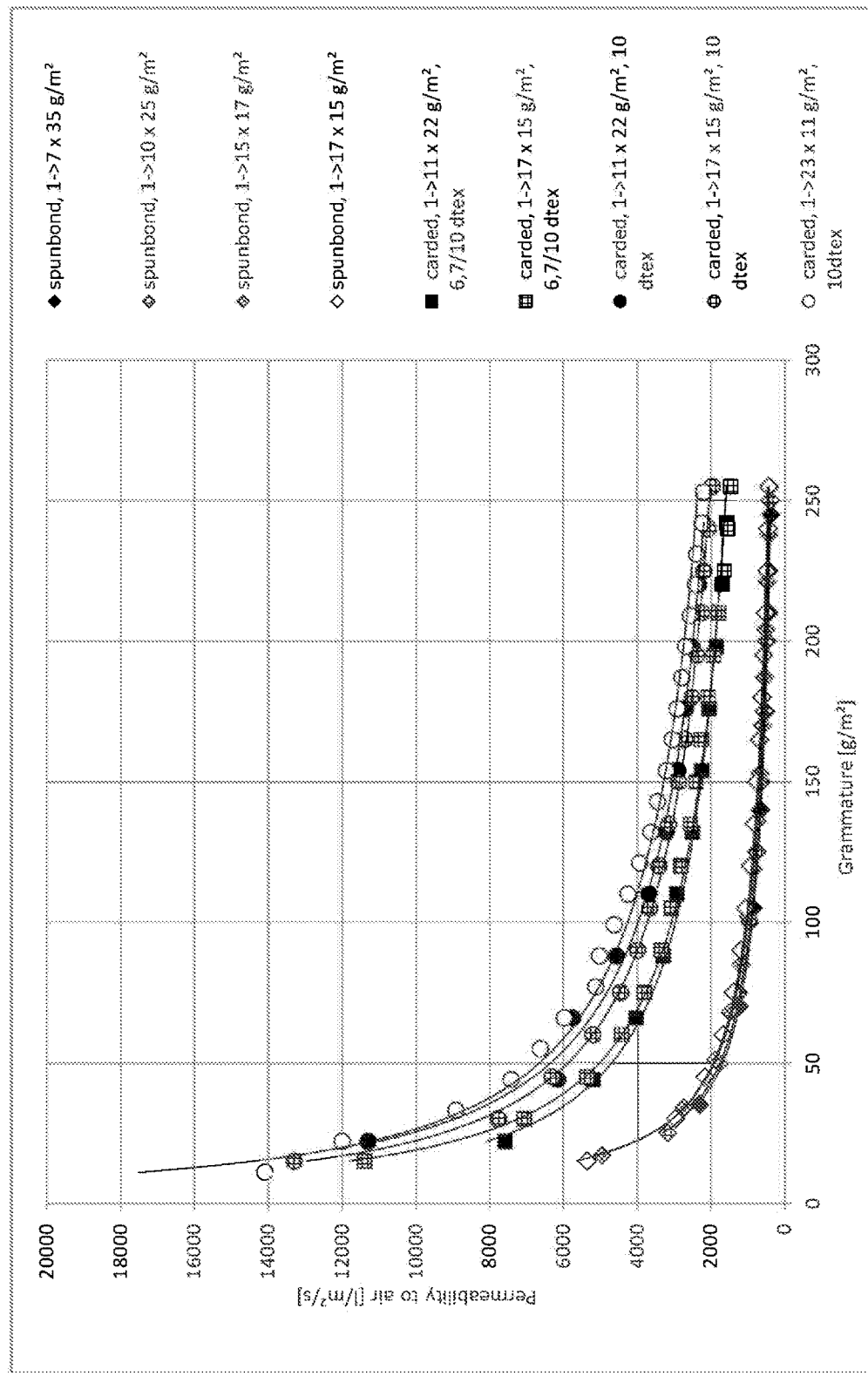
FIG. 4 shows a graph of the dependence of the permeability to air of a coarse filter layer for various materials.

FIG. 4 for the same filter layers shows the dependence of the permeability to air of the total basis weight or number of plies, respectively. It can again be seen that the permeability to air of the multiply spunbond layer is significantly lower than that of the filter layers of carded individual plies.

The table of FIG. 5 illustrates the drop in volume flow in the case of vacuum cleaner filter bags whose coarse filter layer comprises multiple plies of spunbond nonwoven each having a basis weight of 17 g/m². They are therefore comparative examples which are not covered by the invention.

All filter bags used for these readings had the following basic structure:

A coarse filter layer on the inflow side having the respectively specified number of individual plies, then followed by two plies of fine filter material (each a meltblown 18 g/m²) followed by a reinforcement ply on the outflow side of 35 g/m² spunbond fabric. The filter bags had the format of the Miele HyClean Model GN filter bag (mat. no. 07174381 006). These bags have a width of 307 mm and a length of 293 mm. They have a so-called diffuser (continuous, 19 strips, material: CS75T5) as described, for example, in EP 2 263 507.

The filter bags were loaded with DMT8 test dust according to DIN EN 60312:2008. The test dust is available from DMT GmbH & Co. KG, Essen, Germany. The readings were taken with a Miele vacuum cleaner model S8 (S8340), vacuum cleaner no. 00/121809066, model HS15, 1200 W.

Bags with 5, 8, 11 and 15 individual plies for the coarse filter layer were measured. Each row of the table first shows the respective reading for the volume flow for an empty/unused bag in l/s. This is followed by the reading for the volume flow with the vacuum cleaner filter bag filled with 200 g DMT test dust type 8 It is apparent that the volume flow from originally about 38 l/s drops to about 34 l/s to 35 l/s (depending on the number of plies).

When more dust is loaded to a total of 400 g of test dust, a further drop to about 33 l/s to 31 l/s results.

The reading corresponding thereto with vacuum cleaner bags according to the invention is illustrated in the table of FIG. 6. There, the coarse filter layer (in a bag of otherwise identical structure as in the example of FIG. 5) was composed of 5, 8, 11 and 15 plies of carded nonwoven fabric each having a basis weight of 15 g/m2 of PP fibers with a titer of 10 dtex. The empty bag essentially shows a constant volume flow of about 37.5 l/s irrespective of the number of individual plies. When being loaded with 200 g of test dust, the volume flow for a coarse filter layer being composed of five individual plies still amounts to more than 35 l/s and further increases with a higher number of individual plies. A similar picture arises with a total load of 400 g of test dust, for which the drop in volume flow is smaller with a higher number of individual plies.

It arises from these tests that the vacuum cleaner filter bag with a coarse filter layer composed of several individual plies of carded nonwovens has clearly improved properties. The pressure loss remains very small even with a plurality of plies, which leads to improved vacuuming performance. The consistency in vacuuming performance, showing in the lesser drop of the volume flow when DMT8 dust is loaded, is significantly improved.

As is evident from these series of readings, highly different results arise depending on the material used (e.g. spunbond or carded nonwoven) which were also not predictable.

The invention claimed is:

1. A vacuum cleaner filter bag comprising:
a first filter layer and second filter layer,
where said first filter layer is in an air flow direction arranged upstream of said second filter layer, and
where said first filter layer comprises at least 3 and at most 25 individual plies,
where each individual ply is a dry-laid nonwoven fabric having a basis weight of 5 g/m² to 50 g/m²,
wherein said first filter layer has a penetration of more than 60%.

2. The vacuum cleaner filter bag according to claim 1 in which said first filter layer has a basis weight of at least 25 g/m² or at most 300 g/m².

3. The vacuum cleaner filter bag according to claim 1, wherein said first filter layer has a permeability to air of more than 1500 l/(m² s).

4. The vacuum cleaner filter bag according to claim 1, wherein each individual ply of said first filter layer has a permeability to air of more than 6000 l/(m² s).

5. The vacuum cleaner filter bag according to claim 1, wherein said second filter layer has a penetration of less than 40%.

6. The vacuum cleaner filter bag according to claim 1, wherein each individual ply of said first filter layer has a penetration of more than 90%.

7. The vacuum cleaner filter bag according to claim 1, wherein a thickness of said first filter layer is greater than or equal to 0.8 mm/(100 g/m²), or less than or equal to 2 mm/(100 g/m²).

8. The vacuum cleaner filter bag according to claim 1, wherein a thickness of each individual ply of said first filter layer is less than or equal to 0.5 mm.

9. The vacuum cleaner filter bag according to claim 1, wherein said first filter layer has a pressure loss of less than 2 mm $H_2O$.

10. The vacuum cleaner filter bag according to claim 1, wherein each individual ply of said first filter layer has a pressure loss of less than 1 mm $H_2O$.

11. The vacuum cleaner filter bag according to claim 1, wherein each individual ply of said first filter layer comprises staple fibers having a titer of at least 1 dtex or at most 20 dtex.

12. The vacuum cleaner filter bag according to claim 1, wherein each individual ply of said first filter layer is a carded ply or an airlaid ply.

13. The vacuum cleaner filter bag according to claim 1, wherein fibers of said first filter layer comprise synthetic fibers.

14. The vacuum cleaner filter bag according to claim 1, wherein said individual plies of said first filter layer are bonded together along an edge.

15. The vacuum cleaner filter bag according to claim 1, wherein said second filter layer comprises a meltblown ply.

16. The vacuum cleaner filter bag according to claim 1, further comprising a stabilizing ply or a protective ply.

17. The vacuum cleaner filter bag according to claim 1, wherein said bag is formed as a flat bag or as a block-bottom bag.

18. The vacuum cleaner filter bag according to claim 1, wherein the first filter layer comprises at least 5 and at most 15 individual plies.

19. The vacuum cleaner filter bag according to claim 1, wherein each individual ply is a dry-laid nonwoven fabric having a basis weight of 8 $g/m^2$ to 30 $g/m^2$.

20. The vacuum cleaner filter bag according to claim 1, wherein the first filter layer has a basis weight of at least 50 $g/m^2$ or at most 200 $g/m^2$.

\* \* \* \* \*